US011183893B2

(12) United States Patent
Matsubara et al.

(10) Patent No.: US 11,183,893 B2
(45) Date of Patent: Nov. 23, 2021

(54) ROTARY ELECTRIC DEVICE

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Masakatsu Matsubara, Mie (JP); Takashi Hanai, Nagoya (JP); Hideki Hisada, Kuwana (JP); Yusuke Matsuoka, Yokkaichi (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 171 days.

(21) Appl. No.: 16/720,413

(22) Filed: Dec. 19, 2019

(65) Prior Publication Data

US 2020/0127511 A1    Apr. 23, 2020

Related U.S. Application Data

(63) Continuation of application No. PCT/JP2018/030571, filed on Aug. 17, 2018.

(30) Foreign Application Priority Data

Aug. 22, 2017  (JP) .............................. JP2017-159789
Mar. 20, 2018  (JP) .............................. JP2018-053316

(51) Int. Cl.
*H02K 1/27*    (2006.01)
*H02K 21/14*   (2006.01)

(52) U.S. Cl.
CPC ........... *H02K 1/2766* (2013.01); *H02K 21/14* (2013.01); *H02K 2213/03* (2013.01)

(58) Field of Classification Search
CPC .. H02K 1/2766; H02K 21/14; H02K 2213/03; H02K 1/16; H02K 1/27
(Continued)

(56) References Cited

U.S. PATENT DOCUMENTS

2008/0093944 A1* 4/2008 Takahashi .............. H02K 1/246
                                                       310/156.02
2010/0079025 A1   4/2010 Suzuki et al.
(Continued)

FOREIGN PATENT DOCUMENTS

JP    2010-80799 A    4/2010
JP    2014-75882 A    4/2014
(Continued)

OTHER PUBLICATIONS

International Search Report dated Oct. 16, 2018 in PCT/JP2018/030571 filed Aug. 17, 2018, 1 page.

*Primary Examiner* — Alex W Mok
(74) *Attorney, Agent, or Firm* — Oblon, McClelland, Maier & Neustadt, L.L.P.

(57) ABSTRACT

A rotary electric device includes a stator, and a rotor including a rotor core having magnetic poles and permanent magnets at the magnetic poles. Each of two embedding holes in each magnetic pole includes a loading region in which the permanent magnet is loaded, an inner periphery-side gap, and an outer periphery-side gap. Defining D as the minimum distance from the outer periphery-side gap to an outer peripheral surface of the rotor core, Ws the width of a teeth of the stator, H0 as the sum of the magnetomotive forces generated in the portion corresponding to a magnetic pole angle Θ in one magnetic pole, and H1 as the magnetomotive (Continued)

force generated in one tooth, the rotor core is formed such that $D \geq W \times (H0/H1)$.

8 Claims, 5 Drawing Sheets

(58) Field of Classification Search
USPC .................................................. 310/156.56
See application file for complete search history.

(56) References Cited

U.S. PATENT DOCUMENTS

| | | | |
|---|---|---|---|
| 2012/0200187 A1* | 8/2012 | Sano | H02K 1/2766 |
| | | | 310/156.07 |
| 2012/0256508 A1* | 10/2012 | Suzuki | H02K 21/14 |
| | | | 310/156.38 |
| 2013/0307363 A1* | 11/2013 | Sano | H02K 1/27 |
| | | | 310/156.01 |
| 2016/0285330 A1* | 9/2016 | Mukai | F04C 29/0085 |
| 2016/0322872 A1* | 11/2016 | Takahashi | H02K 1/2766 |
| 2017/0093237 A1* | 3/2017 | Tsuda | H02K 3/12 |

FOREIGN PATENT DOCUMENTS

| | | |
|---|---|---|
| JP | 2014-82835 A | 5/2014 |
| JP | 2016-63650 A | 4/2016 |

* cited by examiner

F I G. 1

F I G. 2

F I G. 3

F I G. 4

F I G. 5

ROTARY ELECTRIC DEVICE

CROSS-REFERENCE TO RELATED APPLICATIONS

This application is a Continuation Application of PCT Application No. PCT/JP2018/030571, filed Aug. 17, 2018 and based upon and claiming the benefit of priority from Japanese Patent Applications No. 2017-159789, filed Aug. 22, 2017; and No. 2018-053316, filed Mar. 20, 2018, the entire contents of all of which are incorporated herein by reference.

FIELD

Embodiments described herein relate generally to a rotary electric device in which a permanent magnet is provided on a rotor.

BACKGROUND

In recent years, permanent magnets of a high magnetic energy product have been developed by remarkable research and development of permanent magnets. Permanent magnet type rotary electric devices using such permanent magnets are being applied as electric motors or generators for trains and automobiles. In general, a permanent magnet type rotary electric device comprises a cylindrical stator and a columnar rotor that is rotatably supported inside the stator. The rotor comprises a rotor core and a plurality of permanent magnets embedded in the rotor core.

There has been provided a permanent magnet type rotary electric device forming a magnetic circuit that can use reluctance torque in addition to magnet torque by arranging permanent magnets inside a rotor so as to be shaped in a V letter opening toward the outer circumferential surface side.

An installation space of a rotary electric device used as a driving source for a movable body is limited to small space, and the rotary electric device is required to have high torque and high output in the limited space. Furthermore, if the torque is the same, being more lightweight is desired.

DETAILED DESCRIPTION

Various embodiments will be described hereinafter with reference to the accompanying drawings. In general, according to one embodiment, a rotary electric device comprises: a stator comprising a stator core including a plurality of slots opening to an inner circumferential surface and a plurality of teeth formed between adjacent slots, and an armature winding wound around the plurality of teeth; and a rotor provided rotatably about a central axis and comprising a rotor core including an outer circumferential surface opposed to and spaced apart from the inner circumferential surface of the stator core and a plurality of magnetic poles arranged along the outer circumferential surface, and a plurality of permanent magnets provided on the respective magnetic poles. When an axis extending in a radial direction with respect to the central axis C through a boundary between the central axis C and the adjacent magnetic poles is referred to as a q-axis and an axis separated electrically and magnetically from the q-axis by 90° is referred to as a d-axis, the rotor core includes two embedding holes provided on both sides of the d-axis at each magnetic pole with the permanent magnets arranged in the respective embedding holes, and a plurality of gap holes each provided between the adjacent magnetic poles and opposed to the embedding hole with an interval interposed therebetween. Two embedding holes and two permanent magnets include an inner circumferential side end adjacent to the d-axis and an outer circumferential side end adjacent to the outer circumferential surface, are arranged in line symmetry with respect to the d-axis, and are arranged so as to allow the distance from the central axis of the magnet pole to gradually increase from the inner circumferential side end towards the outer circumferential side end. Each of the embedding holes includes a loading region where the permanent magnet is loaded, an inner circumferential side gap extending from the inner circumferential side end of the permanent magnet towards the d-axis, and an outer circumferential side gap extending from the outer circumferential side end of the permanent magnet towards the outer circumferential surface. When a magnetic pole angle of each magnetic pole is referred to as θ, a shortest distance from the outer circumferential side gap to the outer circumferential surface of the rotor core is referred to as D, a width of the teeth is referred to as W, a sum of magnetomotive forces generated at a portion corresponding to the magnetic pole angle θ in one magnetic pole is referred to as H0, and the magnetomotive force generated in one tooth positioned inside of the magnetic pole angle θ is referred to as H1, the rotor core is formed to satisfy D≥W×(H0/H1).

The same reference numerals attached to common constituent elements throughout the embodiments, and overlapping descriptions are omitted. In addition, each drawing is a schematic diagram for promoting the embodiments and their understanding, and the shapes, dimensions, ratios, etc., are different from those of an actual device, but their design can be changed as appropriate in consideration of the following descriptions and publicly known techniques.

Figure 1:
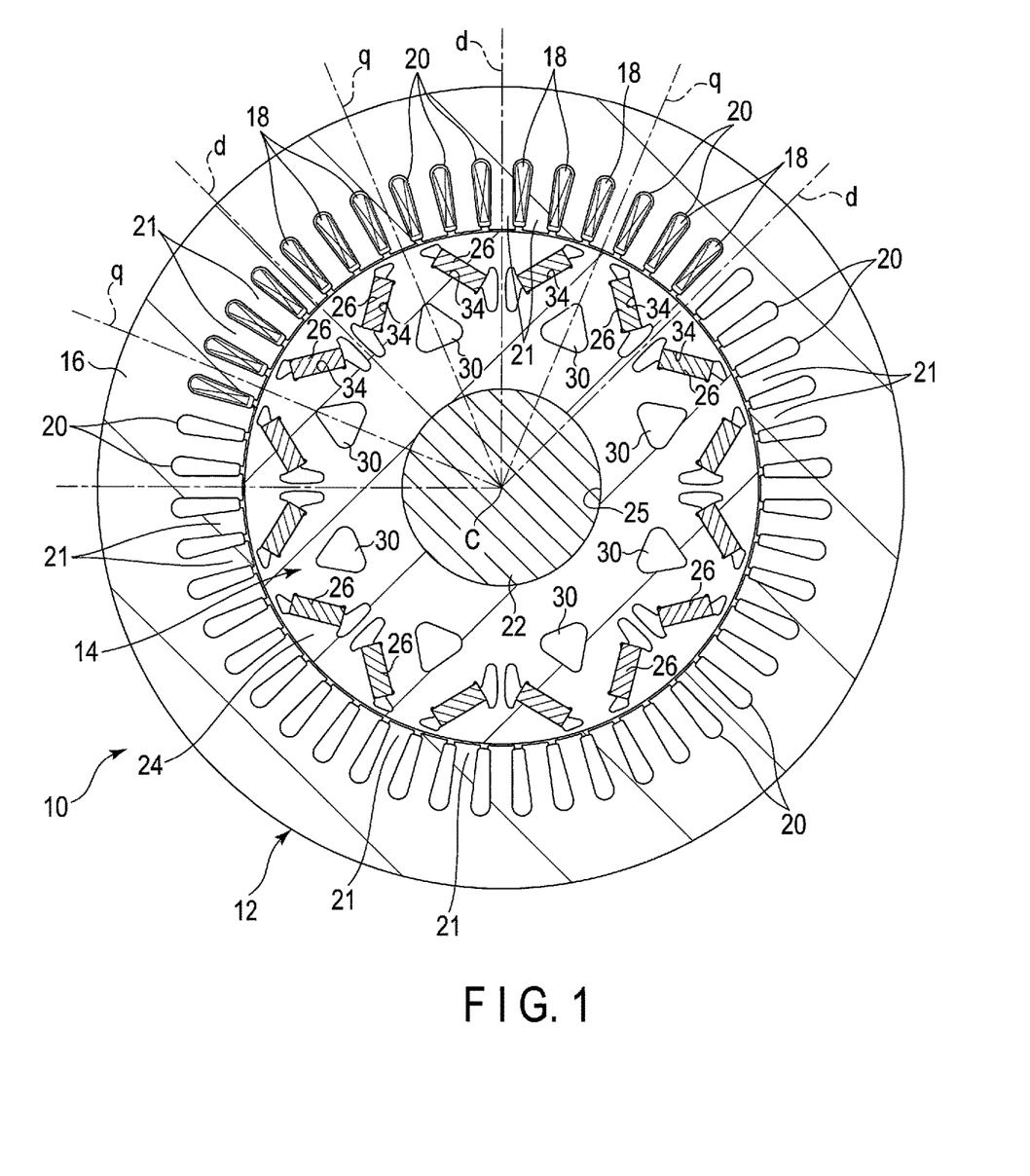
FIG. 1 is a cross-sectional view showing a permanent magnet type rotary electric device according to an embodiment.
Figure 2:
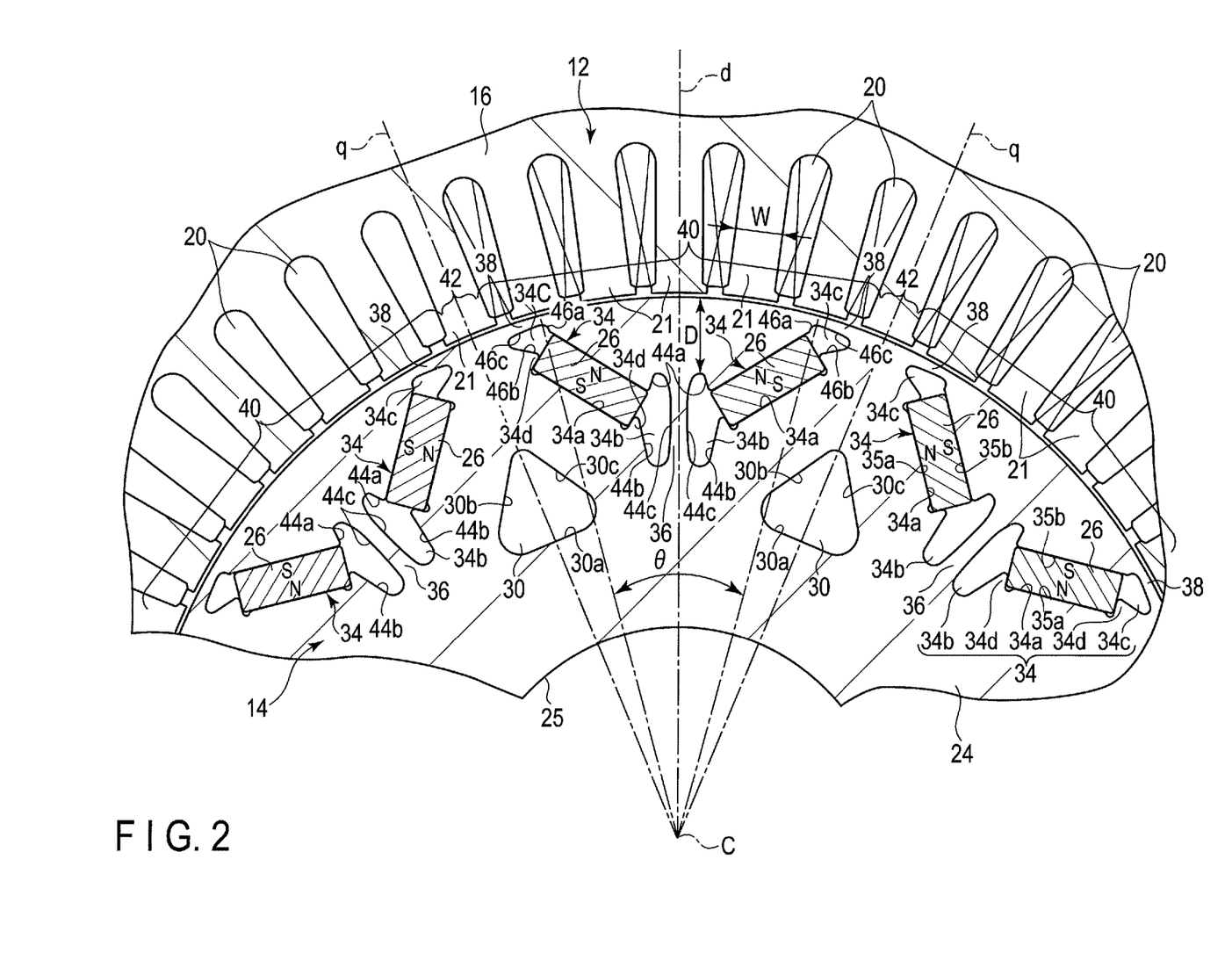
FIG. 2 is an enlarged cross-sectional view showing a part of the rotor of the permanent magnet type rotary electric device.
Figure 3:
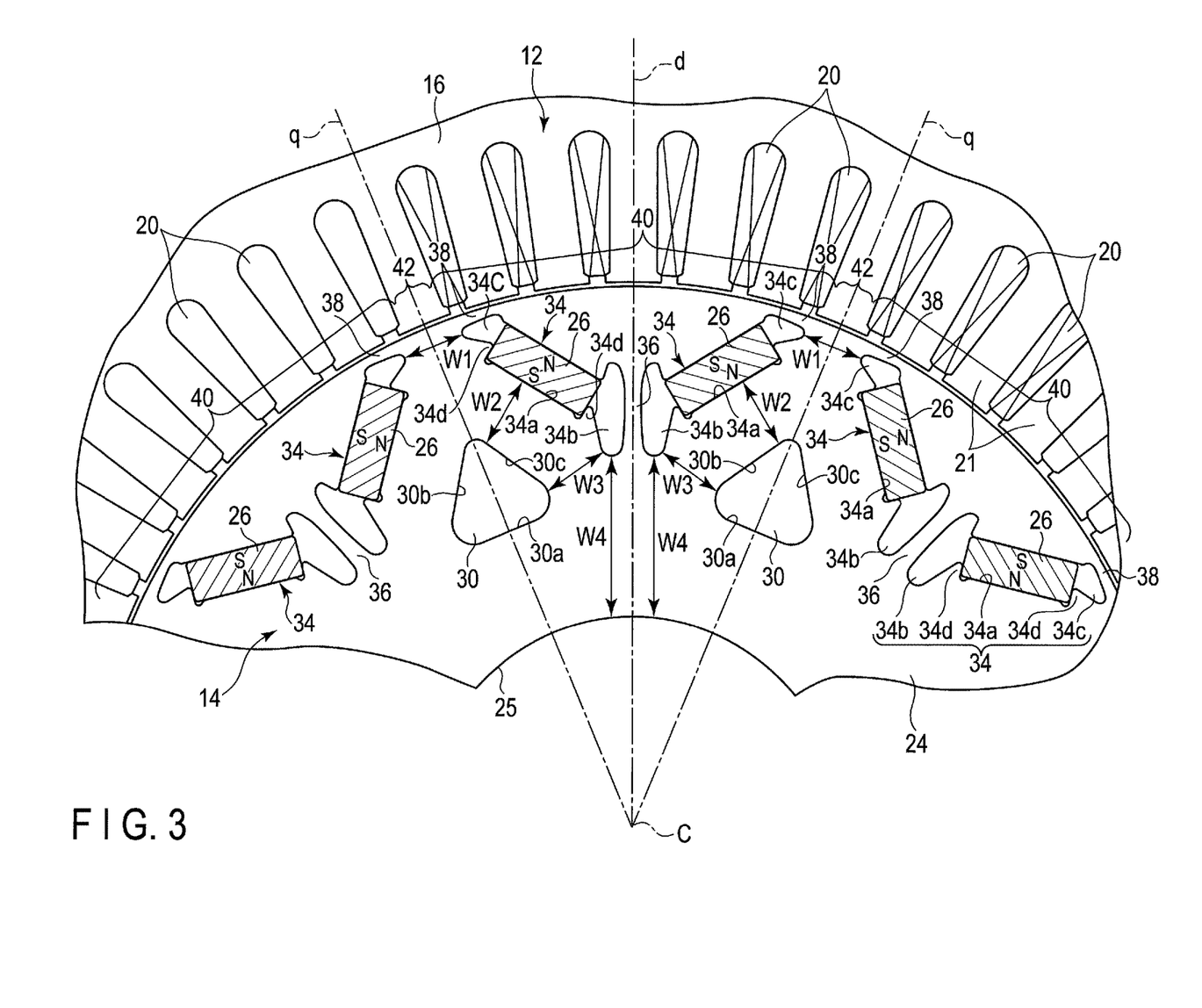
FIG. 3 is an enlarged cross-sectional view showing a part of the rotor of the permanent magnet type rotary electric device.
Figure 4:
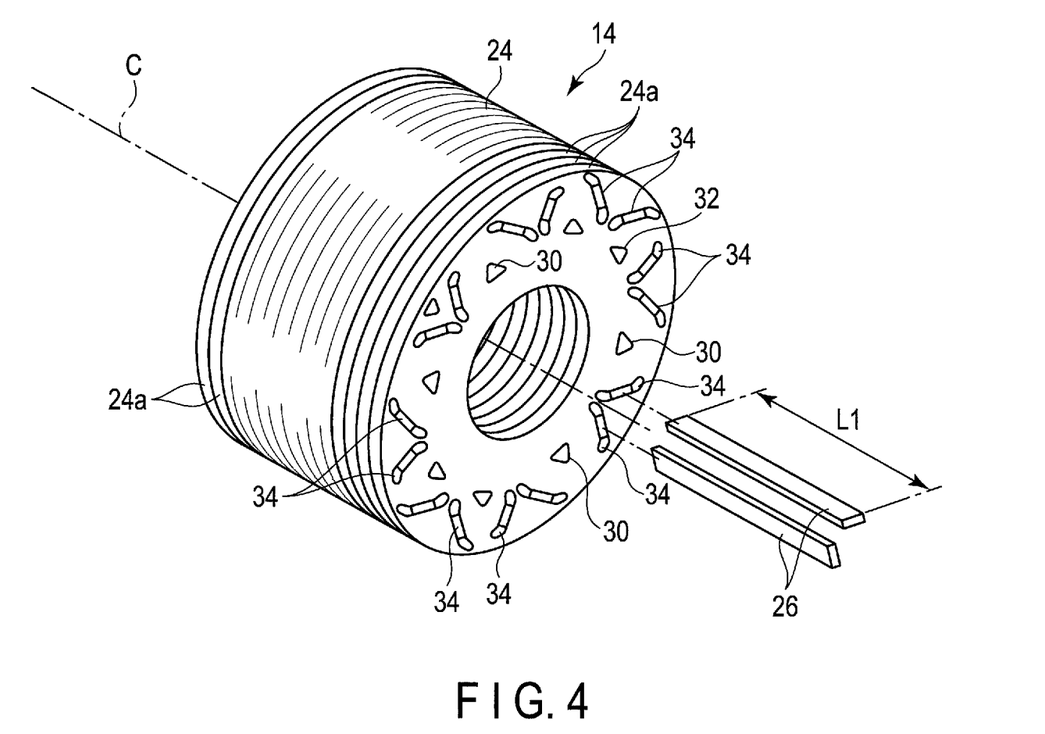
FIG. 4 is a perspective view showing a rotor core and a permanent magnet of the rotary electric device.

FIG. 1 is a cross-sectional view of a permanent magnet type rotary electric device according to an embodiment, FIGS. 2 and 3 are enlarged cross-sectional views showing a part of a rotor, and FIG. 4 is a perspective view showing the rotor.

As shown in FIG. 1, a rotary electric device 10 is configured as, for example, an inner rotor type rotary electric device, and comprises an annular or cylindrical stator 12 supported by a fixed frame (not shown), and a rotor 14 supported coaxially with the stator 12 and rotatably about a central axis C on the inner side of the stator. The rotary electric device 10 is suitably applied to a drive motor or a generator in, for example, a hybrid vehicle (HEV) or an electric vehicle (EV).

The stator 12 comprises a cylindrical stator core 16 and an armature winding 18 wound around the stator core 16. The stator core 16 is configured by laminating a large number of annular electromagnetic steel sheets of a magnetic material, for example, silicon steel, etc., in a concentric shape. A plurality of slots 20 are formed in an inner circumferential portion of the stator core 16. The plurality of slots 20 are arranged at equal intervals in the circumferential direction. Each slot 20 opens to the inner circumferential surface of the stator core 16 and extends radially from the inner circumferential surface. In addition, each slot 20 extends over the entire axial length of the stator core 16. The inner circumferential portion of the stator core 16 constitutes a plurality of (for example, forty-eight, in the present embodiments) stator teeth 21 that face the rotor 14, by forming the plurality of slots 20. Armature windings 18 are embedded in the plurality of slots 20 and wound around the stator teeth 21, respectively. A predetermined flux linkage is formed on the stator 12 (stator teeth 21) by supplying a current to the armature windings 18.

As shown in FIGS. 1 and 4, the rotor 14 includes a columnar shaft (rotary shaft) 22 having both ends rotatably supported by bearings (not shown), a cylindrical rotor core 24 fixed substantially in the center in the axial direction of the shaft 22, and a plurality of permanent magnets 26 embedded in the rotor core 24. The rotor 14 is arranged coaxially inside the stator 12 with a slight gap interposed therebetween. That is, an outer circumferential surface of the rotor 14 faces the inner circumferential surface of the stator 12 with a slight gap. The rotor core 24 has an inner hole 25 formed coaxially with the central axis C. The shaft 22 is inserted and fitted into the inner hole 25 and extends coaxially with the rotor core 24. The rotor core 24 is configured as a laminated body formed by concentrically laminating a large number of annular electromagnetic steel sheets 24a of a magnetic material, for example, silicon steel, etc.

In the present embodiments, the rotor 14 is set to a plurality of magnetic poles, for example, eight magnetic poles. In the cross section of the rotor core 24 shown in FIG. 1, an axis extending in the direction of radius or the radial direction with respect to the central axis C through the central axis C and the boundary between the adjacent magnetic poles is referred to as a q-axis, and an axis separated electrically and magnetically from the q-axis by 90° (an axis electrically and magnetically orthogonal to the q-axis) is referred to as a d-axis (magnetic pole central axis). The d-axis and the q-axis are provided alternately in the circumferential direction of the rotor core 24 and at a predetermined phase. One magnetic pole of the rotor core 24 indicates a region between two adjacent q-axes (⅛ circumferential angle region). For this reason, the rotor core 24 is configured to have eight poles (magnetic poles). A circumferential center of one magnetic pole is the d-axis.

As shown in FIGS. 1 and 2, two permanent magnets 26 are embedded in the rotor core 24 for each magnetic pole. In the circumferential direction of the rotor core 24, magnet embedding holes (hereinafter referred to as embedding holes) 34 corresponding to the shape of the permanent magnet 26 are formed on both sides of each d-axis, and the permanent magnets 26 are arranged in these embedding holes 34, respectively. The permanent magnets 26 are fixed to the rotor core 24 by, for example, an adhesive.

Each embedding hole 34 extends through the rotor core 24 in the axial direction. Each of the embedding holes 34 has a substantially rectangular cross-sectional shape and is inclined with respect to the d-axis. When viewed in a cross section orthogonal to the central axis C of the rotor core 24, the two embedding holes 34 are arranged in, for example, a substantially V shape. That is, the inner circumferential ends of the two embedding holes 34 are adjacent to the d-axis, and face each other with a slight gap interposed therebetween. In the rotor core 24, a narrow magnetic path narrowing portion (bridge portion) 36 is formed between the inner circumferential side ends of the two embedding holes 34. The outer circumferential side ends of the two embedding holes 34 are remote from the d-axis along the circumferential direction of the rotor core 24, and are positioned in the vicinity of the outer circumferential edge of the rotor core 24 and in the vicinity of the q-axis. The outer circumferential side end of the embedding hole 34 is therefore opposed to the outer circumferential side end of the embedding hole 34 of the adjacent magnetic pole with the q-axis interposed therebetween. In the rotor core 24, a narrow magnetic path narrowing portion (bridge portion) 38 is formed between the outer circumferential side end of each embedding hole 34 and the outer circumferential edge of the rotor core 24. As described above, the two embedding holes 34 are arranged such that the distance from the d-axis gradually increases from the inner circumferential side end toward the outer circumferential side end.

As shown in FIG. 2, each permanent magnet 26 has a rectangular cross-sectional shape, and has a first surface and a second surface (back surface) facing each other in parallel, and a pair of side surfaces facing each other. Each magnet 26 is magnetized in a direction perpendicular to the first surface and the second surface.

Each embedding hole 34 includes a rectangular loading region 34a corresponding to the cross-sectional shape of the permanent magnet 26, two gaps (inner circumferential side gap 34b and outer circumferential side gap 34c) extending on both sides in the longitudinal direction of the loading region 34a (a direction perpendicular to the magnetization direction of the permanent magnet 26), and a pair of engage projections 34d protruding into the embedding hole 34 from the inner circumferential side end surface 35a of the embedding hole 34 at both longitudinal ends of the loading region 34a.

The loading region 34a is defined between a flat rectangular inner circumferential side end surface 35a and a flat rectangular outer circumferential side end surface 35b parallel to and opposed to the inner circumferential side end surface 35a. The inner circumferential side gap 34b is defined by a first inner side surface 44a, a second inner side surface 44b, and a third inner side surface 44c. The first inner side surface 44a extends substantially parallel to the d-axis, from one end (end on the d-axis side) of the outer circumferential side end surface 35b of the loading region 34a toward the outer circumferential surface of the rotor core 24. The second inner side surface 44b extends substantially parallel to the d-axis, from one end (end on the d-axis side or the engage projection 34d) of the inner circumferential side end surface 35a of the loading region 34a toward the central axis C of the rotor core 24. The third inner side surface 44c extends substantially parallel to the d-axis, across an extending end of the first inner side surface 44a and an extending end of the second inner side surface 44b. Both end portions of the third inner side surface 44c are connected to the first inner side surface 44a and the second inner side surface 44b via arcuate surfaces. In the inner circumferential side gaps 34b of the two embedding holes 34, the third inner side surfaces 44c are arranged opposite to each other with the cl-axis and the bridge portion 36 interposed therebetween.

The outer circumferential side gap 34c is defined by a first inner side surface 46a, a second inner side surface 46b, and a third inner side surface 46c. The first inner side surface 46a extends from the other end (end on the outer circumferential surface side of the rotor core) of the outer circumferential side end surface 35b of the loading region 34a toward the outer circumferential surface of the rotor core 24. The second inner side surface 46b extends from the other end of the inner circumferential side end surface 35a of the loading region 34a (end on the outer circumferential surface side of the rotor core or the engage projection 34d) toward the outer circumferential surface of the rotor core 24. The third inner side surface 46c extends along the outer circumferential surface of the rotor core 24, across an extending end of the first inner side surface 46a and an extending end of the second inner side surface 46b. A bridge portion 38 is defined between the third inner side surface 46c and the outer circumferential edge of the rotor core 24.

The inner circumferential side gap 34b and the outer circumferential side gap 34c function as flux barriers that suppress magnetic flux leakage from both longitudinal ends of the permanent magnet 26 to the rotor core 24, and contribute to weight reduction of the rotor core 24.

A plurality of gap holes (hollow portions) 30 are formed in the rotor core 24. Each of the gap holes 30 extends through the rotor core 24 in the axial direction. The gap hole 30 is located approximately at the center in the radial direction of the rotor core 24 on the q-axis, and is provided between two embedding holes 34 of adjacent magnetic poles. The gap hole 30 has a polygonal, for example, triangular cross-sectional shape. The cross section of the gap hole 30 has one side 30a orthogonal to the q-axis, and two sides 30b and 30c opposed to the embedding hole 34 with an interval interposed therebetween. Each gap hole 30 functions as a flux barrier that makes it difficult for magnetic flux to pass, and regulates the flow of flux linkage of the stator 12 and the flow of magnetic flux of the permanent magnet 26. In addition, the weight reduction of the rotor core 24 can be attempted by forming the gap hole 30.

As shown in FIGS. 2 and 4, the permanent magnet 26 is loaded in each embedding hole 34 and embedded in the rotor core 24. For example, the permanent magnet 26 is formed in an elongated flat plate shape having a rectangular lateral cross section, and has a length L1 that is substantially equal to the axial length of the rotor core 24. Each permanent magnet 26 is embedded over a substantially entire length of the rotor core 24. The magnetization direction of the permanent magnet 26 is set to a direction orthogonal to the front and back surfaces of the permanent magnet 26. It should be noted that the permanent magnet 26 may be configured by combining a plurality of magnets divided in the axial direction (longitudinal direction and, in this case, the permanent magnet 26 is formed such that the total length of the plurality of magnets is substantially equal to the axial length of the rotor core 24.

The permanent magnet 26 is disposed in the loading region 34a of the embedding hole 34 and is fixed to the rotor core 24 with an adhesive or the like. A pair of corners of the permanent magnet 26 are in contact with the engage projection 34d. The permanent magnet 26 is thereby positioned in the loading region 34a. The two permanent magnets 26 positioned on both sides of each d-axis are arranged side by side in a substantially V shape that opens toward the outer circumferential edge of the rotor core 24. That is, the two permanent magnets 26 are arranged such that the distance from the d-axis gradually increases from the inner circumferential side end toward the outer circumferential side end.

The two permanent magnets 26 located on both sides of each d-axis, that is, the two permanent magnets 26 constituting one magnetic pole are arranged such that their magnetization directions are the same as each other. In addition, the two permanent magnets 26 located on both sides of each q-axis are arranged such that their magnetization directions are opposite to each other. The region on each d-axis is formed around one magnetic pole 40 and the region on each q-axis is formed around a magnetic pole interval portion 42, in the outer circumferential portion of the rotor core 24, by arranging the plurality of permanent magnets 26 as described above. In the present embodiment, as the rotary electric device 10, a permanent magnet embedded type rotary electric device wound with a single-layer distributed wire is configured by eight poles (four pole pairs) and forty-eight slots in which front and back sides of the N and S poles of the permanent magnet 26 are alternately arranged for each of adjacent magnetic poles 40.

As shown in FIG. 2, in the lateral cross section of the rotary electric device, the distance (shortest distance) between the inner circumferential side gap 34b and the outer circumferential edge of the rotor core 24 is referred to as D, the width of each stator tooth 21 (minimum width in the circumferential direction of the rotor) is referred to as W, the magnetic pole angle (electrical angle or radian) of one magnetic pole is referred to as θ, the number of magnetic poles is referred to as P, and the number of slots of the stator 12 is referred to as N. It should be noted that, in the present embodiment, the magnetic pole angle θ is an internal angle between the two outer circumferential side gaps 34c located on both sides of the d-axis, more specifically, an internal angle between the d-axis side ends of the third inner side surface 46c.

It is assumed that the magnetomotive force is distributed in the circumferential direction of the rotor 14 in a substantially sine wave shape by the number of pole pairs. In addition, the amplitude of the magnetomotive force is set to 1. The q-axis magnetomotive force will be considered for the magnetic flux flowing through the magnetic path whose distance D is the magnetic path width. Regarding the q-axis magnetomotive force of each magnetic pole, sum H0 of magnetomotive forces generated at the portion corresponding to the magnetic pole angle θ is $$H0 = \int_0^{\frac{\theta}{2}} \sin\theta d\theta = -\left(\cos\left(\frac{\theta}{2}\right) - \cos(0)\right) = 1 - \cos\left(\frac{\theta}{2}\right).$$

Regarding the q-axis magnetomotive force, magnetomotive force H1 for one tooth located inside the magnetic pole angle θ is $$H1 = \int_{\frac{\theta}{2} - \frac{2\pi}{\frac{2N}{P}}}^{\frac{\theta}{2}} \sin\theta d\theta$$

$$= -\left(\cos\left(\frac{\theta}{2}\right) - \cos\left(\frac{\theta}{2} - \frac{2\pi}{\frac{2N}{P}}\right)\right)$$

$$= \cos\left(\frac{\theta}{2} - \frac{\pi P}{N}\right) - \cos\left(\frac{\theta}{2}\right).$$

The magnetic flux density of one tooth 21 is proportional to H1/W from tooth width W and the magnetomotive force of one tooth. In addition, the magnetic flux density in the region (magnetic path) of distance D is proportional to H0/D from the magnetomotive force H0 and the distance D. To prevent magnetic saturation in the region of distance D (magnetic path of width D) in the rotor core 24, the distance D is set to $D \geq W \times (H0/H1)$. More desirably, the rotor core 24 is configured to satisfy a relationship of $$0.8 \times W \times (H0/H1) \leq D \leq 1.8 \times W \times (H0/H1).$$

The inner circumferential side gap 34b and the outer circumferential side gap 34c are formed to the maximum within a range in which the distance (width) D satisfies the above relationship.

Furthermore, in the present embodiment, as shown in FIG. 3, the interval between the outer circumferential side gaps 34c of two adjacent magnetic poles is referred to as W1, the interval (shortest distance) between the gap hole 30 and the loading region 34a of the embedding hole 34 is referred to as W2, the interval between the gap hole 30 and the inner circumferential side gap 34b of the embedding hole 34 is referred to as W3, and the interval (shortest distance) between the inner hole 25 of the shaft 22, that is, the rotor core 24, and the inner circumferential side gap 34b of the embedding hole 34 is referred to as W4. In this case, the rotor core 24 is formed to satisfy the relationships of $W1 \leq W2$, $W1 \leq W3$, and $W1 \leq W4$. Of the intervals W1, W2, W3, and W4, the interval W1 is the narrowest so as to form the narrowest magnetic path. In addition, $W2 \leq W4$ and $W3 \leq W4$, and the magnetic path having the widest interval W4 is formed between the inner circumferential side gap 34b of the embedding hole 34 and the inner hole 25. The intervals W2 and W3 may be either $W2 \leq W3$ or $W3 \leq W2$, and the width of the magnetic path formed between the embedding hole 34 and the gap hole 30 may be larger than the interval W1 and smaller than the interval W4.

According to the permanent magnet type rotary electric device 10 configured as described above, when the armature winding 18 is energized, the rotor 14 rotates about the shaft 22 due to the interaction between the flux linkage generated from the armature winding 18 and the generated magnetic field of the permanent magnet 26. The rotary electric device 10 is driven to rotate by a total torque including a reluctance torque that attempts to minimize the magnetic path through which the magnetic flux passes in addition to the magnet torque caused by an attractive force and a repulsive force generated between the stator 12 and the permanent magnet 26. The rotary electric device 10 can output electrical energy that is energized and input as mechanical energy from the shaft 22 that rotates integrally with the rotor 14.

By setting the width D of the magnetic path in the rotor core 24 to a minimum width within a range where magnetic saturation does not occur, the inner circumferential side gap 34b and the outer circumferential side gap 34c can be maximized accordingly. That is, the gap can be maximized and the weight reduction of the rotor 14 can be attempted while suppressing a decrease in torque property.

Each of the intervals W1, W2, W3, and W4 of the portions of the rotor 14 corresponds to the width of the magnetic path through which the magnetic flux flows. By setting these intervals to $W1 \leq W2$, $W1 \leq W3$, and $W1 \leq W4$, that is, by making the interval W1 between the outer circumferential side gaps 34c of the embedding holes 34 of the adjacent magnetic poles 40 the smallest, the magnetic path of this portion is made the narrowest. This restricts the flow of magnetic flux, prevents magnetic flux leakage to the adjacent magnetic pole, and allows the magnetic flux to flow efficiently in the magnetic path on the magnetic pole central axis (d-axis) side. The magnetic flux flowing in the rotor 14 from the armature winding 18 and the magnetic flux of the permanent magnet 26 can be made to contribute effectively to the generation of torque, and the torque property of the rotary electric device can be improved. Furthermore, providing a plurality of gap holes 30 to set the above-described interval, that is, the magnetic path width can reduce the weight of the rotor core 24 and contribute to weight reduction of the rotary electric device 10. By setting the intervals to $W1 \leq W2$, $W1 \leq W3$, and $W1 \leq W4$, it is possible to maximize the substantially triangular gap hole 30 while minimizing the decrease in torque due to the decrease in q-axis magnetic flux.

As described above, according to the present embodiments, a permanent magnet type rotary electric device capable of reducing the weight while maintaining the torque property can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 5:
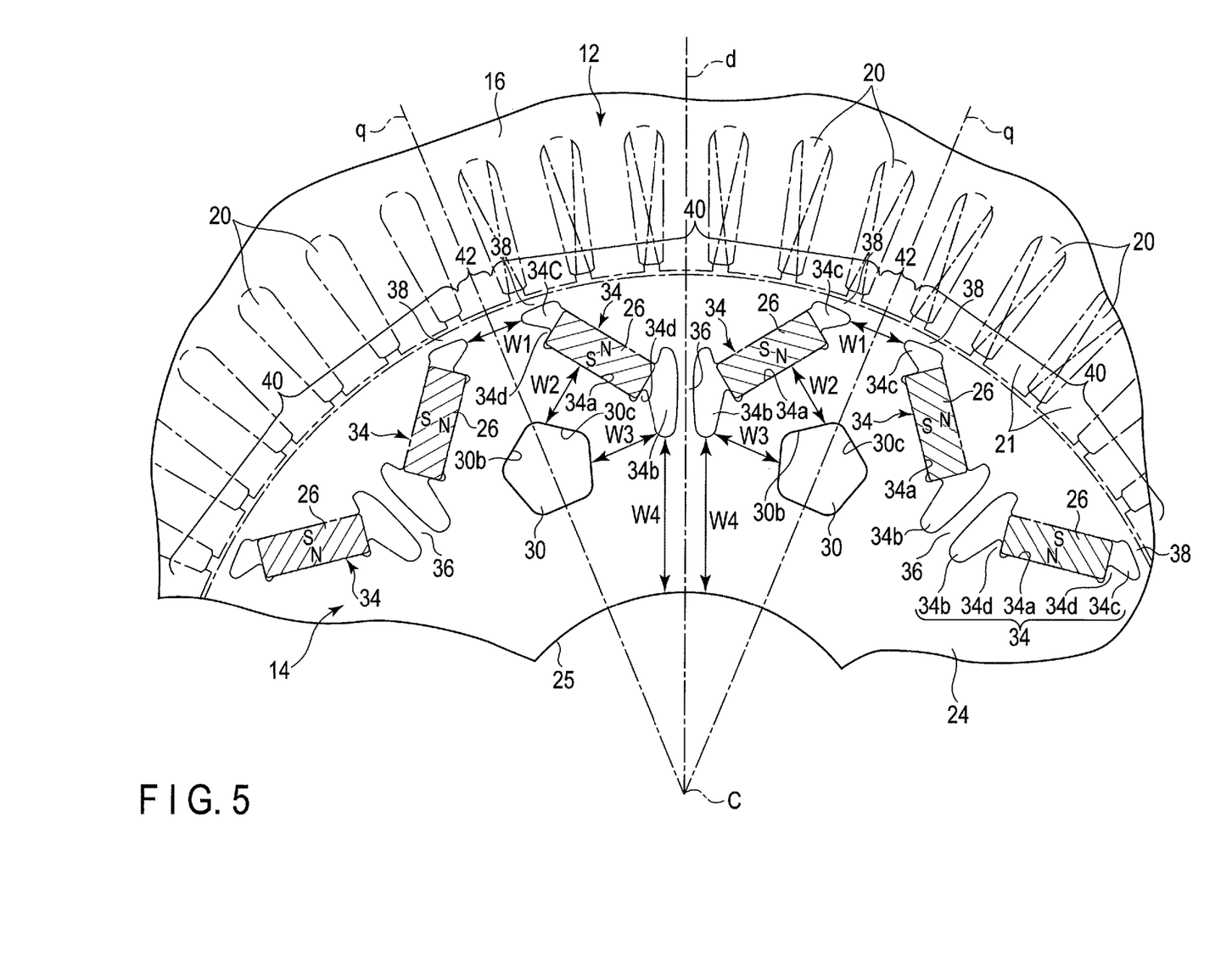
FIG. 5 is an enlarged cross-sectional view showing a part of a rotor of a permanent magnet type rotary electric device according to a modification.

For example, the number, the dimensions, the shape, and the like of the magnetic poles are not limited to the above-described embodiments, and can be variously changed in accordance with the design. The cross-sectional shape of the inner circumferential side gap and the outer circumferential side gap is not limited to the shape of the embodiment, and various shapes can be selected. The cross-sectional shape of the gap hole 30 is not limited to a triangle, and various shapes can be selected. For example, as shown in FIG. 5, the gap hole 30 may be a hole having a pentagonal cross-sectional shape. The gap hole 30 may have a shape having at least two sides 30b and 30c opposed to the embedding hole 34 at a predetermined interval.

What is claimed is:

1. A rotary electric device comprising:
a stator comprising a stator core including a plurality of slots opening to an inner circumferential surface and a plurality of teeth formed between adjacent slots, and an armature winding wound around the plurality of teeth; and
a rotor rotatable about a central axis, comprising a rotor core including an outer circumferential surface opposed to and spaced apart from the inner circumferential surface of the stator core and a plurality of magnetic poles arranged along the outer circumferential surface, and a plurality of permanent magnets provided at the respective magnetic poles,
wherein when an axis extending in a radial direction with respect to the central axis through the central axis C and a boundary between the adjacent magnetic poles is referred to as a q-axis and an axis separated electrically and magnetically from the q-axis by 90° is referred to as ad-axis, the rotor core includes two embedding holes provided on both sides of the d-axis at each magnetic pole with the permanent magnets arranged in the respective embedding holes, and a plurality of gap holes each provided between the adjacent magnetic poles and opposed to the embedding holes with an interval interposed therebetween,
two embedding holes and two permanent magnets include an inner circumferential side end adjacent to the d-axis and an outer circumferential side end adjacent to the outer circumferential surface, are arranged in line symmetry with respect to the d-axis, and are arranged so as to allow a distance from the d-axis to gradually increase from the inner circumferential side ends towards the outer circumferential side ends, each of the embedding holes includes a loading region where the permanent magnet is arranged, an inner circumferential side gap extending from the inner circumferential side end of the permanent magnet towards the d-axis, and an outer circumferential side gap extending from the outer circumferential side end of the permanent magnet towards the outer circumferential surface, and when a magnetic pole angle (electric angle) of each magnetic pole is referred to as $\Theta$, a shortest distance from the outer circumferential side gap to the outer circumferential surface of the rotor core is referred to as D, a width of the teeth is referred to as W, a sum of magnetomotive forces generated at a portion corresponding to the magnetic pole angle $\Theta$ in one magnetic pole is referred to as H0, and the magnetomotive force generated in one tooth positioned inside of the magnetic pole angle $\Theta$ is referred to as H1, the rotor core is formed to satisfy a relationship of $D \geq W \times (H0/H1)$.

2. The rotary electric device of claim 1, wherein the rotor core is formed to satisfy a relationship of $0.8 \times W \times (H0/H1) \leq D \leq 1.8 \times W \times (H0/H1)$.

3. The rotary electric device of claim 2, wherein the rotor core includes an inner circumferential side end surface defining the loading region of the embedding hole, an outer circumferential side end surface opposed to the inner circumferential side end surface, and a first inner side surface, a second inner side surface, and a third inner side surface that define the inner circumferential side gap, the first inner side surface extends from an end on the d-axis side of the outer circumferential side end surface toward an outer circumferential surface of the rotor core, the second inner side surface extends from an end on the d-axis side of the inner circumferential side end surface toward a central axis of the rotor core, the third inner side surface extends across an extending end of the first inner side surface and an extending end of the second inner side surface, along the d-axis, and the distance D is a shortest distance between the extending end of the first inner side surface and the outer circumferential surface of the rotor core.

4. The rotary electric device of claim 1, wherein the rotor core includes an inner circumferential side end surface defining the loading region of the embedding hole, an outer circumferential side end surface opposed to the inner circumferential side end surface, and a first inner side surface, a second inner side surface, and a third inner side surface that define the inner circumferential side gap, the first inner side surface extends from an end on the d-axis side of the outer circumferential side end surface toward an outer circumferential surface of the rotor core, the second inner side surface extends from an end on the d-axis side of the inner circumferential side end surface toward a central axis of the rotor core, the third inner side surface extends across an extending end of the first inner side surface and an extending end of the second inner side surface, along the d-axis, and the distance D is a shortest distance between the extending end of the first inner side surface and the outer circumferential surface of the rotor core.

5. The rotary electric device of claim 1, wherein the rotor core includes an inner hole which is formed coaxially with the central axis and into which a shaft is fitted, the inner circumferential side gaps of the two embedding holes are located opposite to each other with the d-axis sandwiched therebetween, and the outer circumferential side gaps of the two embedding holes are located remote from the d-axis and adjacent and opposite to an outer circumferential side gap of the embedding hole of an adjacent magnetic pole, and when an interval between the outer circumferential side gap of the embedding hole and the outer circumferential side gap of the embedding hole of the adjacent magnetic pole is referred to as W1, an interval between the gap hole and a loading region of the embedding hole is referred to as W2, an interval between the gap hole and the inner circumferential side gap of the embedding hole is referred to as W3, and an interval between the inner hole of the rotary core and the inner circumferential side gap of the embedding hole is referred to as W4, the rotary core is formed to satisfy $W1 \leq W2$, $W1 \leq W3$, and $W1 \leq W4$.

6. The rotary electric device of claim 5, wherein the gap hole is formed to have a cross section having at least two sides each opposed to the embedding holes with an interval interposed therebetween.

7. The rotary electric device of claim 1, wherein the rotor core includes an inner circumferential side end surface defining the loading region of the embedding hole, an outer circumferential side end surface opposed to the inner circumferential side end surface, and a first inner side surface, a second inner side surface, and a third inner side surface that define the inner circumferential side gap, the first inner side surface extends from an end on the d-axis side of the outer circumferential side end surface toward an outer circumferential surface of the rotor core, the second inner side surface extends from an end on the d-axis side of the inner circumferential side end surface toward a central axis of the rotor core, the third inner side surface extends across an extending end of the first inner side surface and an extending end of the second inner side surface, along the d-axis, and the distance D is a shortest distance between the extending end of the first inner side surface and the outer circumferential surface of the rotor core.

8. The rotary electric device of claim 1, wherein the permanent magnet is formed in a plate shape having a rectangular cross section and extends over an entire length in an axial direction of the rotor core.

* * * * *